Patented Jan. 9, 1945

2,367,073

UNITED STATES PATENT OFFICE 2,367,073

ARYLAZOAROYLGUANYLUREAS AND THEIR SALTS

Jack T. Thurston, Riverside, Conn., assignor to American Cyanamid Company, New York, N. Y., a corporation of Maine No Drawing. Application May 28, 1943,
Serial No. 488,891

9 Claims. (Cl. 260—163)

This invention relates to new azo dyestuffs and to their preparation. More particularly, the new azo dyes to be described and claimed herein may be broadly designated as arylazoaroylguanylureas.

The arylazoaroylguanylureas of the present invention may be represented by the general formula

in which Ar and Ac are aromatic radicals. Ar and Ac may be the same, or different, type of aromatic radical and may have various types and kinds of substituent groups as will be shown hereinafter.

Azo dyes having the above general formula may be prepared by diazotizing an aromatic acyl guanylurea which contains an amino group in the aromatic ring and then coupling it with an aromatic coupling component, containing an amino or hydroxyl group attached to the aromatic ring, through the diazoic group. Among the aromatic acyl guanylureas which may be diazotized and coupled with aromatic components to form new dyes are those such as p-aminobenzoylguanylurea, m-aminobenzoylguanylurea, 3-amino-5-hydroxybenzoylguanylurea, 4-amino-α-naphthoylguanylurea, 5-amino-β-naphthoylguanylurea, aminophenylacetylguanylurea, aminophenylstearoylguanylurea, β-(4-aminophenyl)-propionylguanylurea, m-amino-cinnamylguanylurea, 4-(4'-amino-2'-nitrophenyl)-butene-3-oyl-guanylurea, 4-aminophthaloyl-bis-guanylurea, 2-(4'-aminobenzoyl)-benzoylguanylurea, 3-aminophenoxyacetylguanylurea, 3-aminophenoxydiethoxyacetylguanylurea and the like.

These aromatic acyl guanylureas are prepared by hydrolyzing the terminal —C≡N group of a corresponding aromatic acyl dicyandiamide in the presence of an acid. The preparation of these new aromatic acyl guanylureas in described in detail and claimed in the co-pending application of Donald W. Kaiser and Jack T. Thurston, Serial No. 463,666, filed October 28, 1942.

The diazotized amino aromatic acyl guanylureas may be coupled with aromatic amino or hydroxy compounds capable of azoic coupling. By "aromatic" I mean any cyclic compound, whether carbocyclic or heterocyclic, having conjugated double bonds. Familiar compounds of this class are those belonging to the benzene, naphthalene, pyrazolone, carbazole, benzothiazole, 1,2,4-triazole, 3-hydroxyindole and other series. These compounds may be substituted with alkyl, aryl, cycloalkyl, halide, hydroxy, nitro, cyano, sulfo, sulfamido, carboxy, carbonyl, carbamyl, amino and other radicals as will appear from the specific compounds named below and from the specific illustrative examples.

Specific instances of suitable coupling compounds of these types are: the hydroxy benzenes and substituted hydroxy benzenes such as 1,3-dihydroxy benzene, 2,6-dihydroxybenzoic acid, 1,2,3-trihydroxy benzene, guaiacol, m-nitrophenol, chlorophenols, naphthols, aminonaphthols, naphthol sulfonic acids, phenolsulfonic acids, etc.; the amino benzenes and substituted amino benzenes such as aniline, metanilic acid, dimethylaniline, diethylaniline-m-sulfonic acid, ethylbenzylaniline, ethylbenzylaniline sulfonic acid, 1,3-diaminobenzene, ortho- and meta-toluidine, p-xylidine, 2,5-dihydroxyalkylaminobenzene, m-toluylene-diamine, phenylazoaniline, 3-aminophenol-6-sulfonic acid, o-methoxyaniline, p-ethoxyaniline, ortho-aminobenzoic acid, etc.; the hydroxy and amino naphthalenes such as α- and β-naphthols, α- and β-naphthylamines, the naphthylamine sulfonic acids, 1-naphthol-3-sulfonic acid. 1-amino-8-nitro-2-naphthol-4-sulfonic acid, 1,8-dihydroxynaphthalene-3,6-disulfonic acid, 1-chloro-8-naphthol-3,6-disulfonic acid, 2-naphthol-7-sulfonic acid, 2-amino-8-naphthol-6-sulfonic acid, 2-naphthol-6,8-disulfonic acid, 2-acetylamino-5-naphthol-7-sulfonic acid, 2-N-β-hydroxyethylamino-8-naphthol-6-sulfonic acid, 1,8-amidonaphthol-3,6-disulfonic acid, 7-hydroxy-1-naphthyl-m-hydroxyphenylamine, etc.; the arylides of naphthoic acids as for example the benzidide of β-hydroxynaphthoic acid, 2-hydroxynaphthanilide, β-hydroxynaphthoic anilide, etc.; pyrazolones and pyrazyl pyrazolones such as 3-methyl-5-pyrazolone, 1-phenyl-3-methyl-5-pyrazolone, 1-(4'-sulfophenyl)-3-methyl-5-pyrazolone, 1-(2'-naphthyl)-3-methyl-5-pyrazolone-8'-sulfonic acid, and the like; ortho- and meta-hydroxybenzoyl-guanylurea, o-hydroxyphenoxyacetylguanylurea, aminohydroxybenzoylguanylurea, ortho- and meta-hydroxybenzoyldicyandiamide, o-hydroxyphenoxyacetyldicyandiamide, aminohydroxybenzoyldicyandiamide, etc.; arylides of acetoacetic acid such as diacetoacetictolidide, furoylacetic acid, hydroxy-dibenzothiophene carboxylic acids, etc.; and those condensation products of aryl amines with α-hydroxymethane sulfonic acids such as specifically N-o-methylphenylaminomethanesulfonic acid, etc.

By selecting appropriate coupling components it is possible to prepare dyes having particular utility in dyeing fabrics of cellulosic fibers such as cotton, regenerated cellulose, cellulose esters and ethers, etc.; wool, silk, nylon and other natural and synthetic fibers. Dyes may be formed which are either acidic or basic in character. They may be formed having solubilizing groups, such as sulfonic or carboxyl groups, or not, as desired. Some of the dyes may be metallized with copper, chromium, iron, manganese, cobalt, nickel, etc., and made more stable. For example, when the radicals Ar and Ac each have hydroxyl groups, hydroxyl and carbonyl, hydroxyl and amino, or hydroxyl and carboxyl groups in ortho position to the azo bridge the dyes may be metallized. A typical metallizable dye of this type can be made by diazotizing p-amino-m-hydroxybenzoylguanylurea and coupling it with β-naphtholsulfonic acid in alkaline solution. The dyes of the present invention may also be employed in the preparation of printing inks, textile printing pastes, colored lacquers, colored plastic compositions, for dyeing paper and in other related fields.

Most of the new dyestuffs covered by the general formula

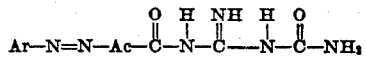

may also be prepared by coupling an amino or hydroxy aromatic acyl guanylurea to a diazotized aryl amine. Typical amines which can be diazotized and reacted with aromatic acyl guanylureas having activating groups thereon are the following: aniline and substituted anilines such as toluidine, 2,4-dimethylaniline, monofluoroaniline, monochloroanilines, 2,5 - dichloroaniline, m - aminobenzotrifluoride, 2-methyl-3-chloroaniline, 2-methyl-4-chloroaniline, 2-methyl-5-chloroaniline, 2-methyl - 4 - chloro - 5 - bromoaniline, 4-methyl-2,5-dichloroaniline, 2-methyl-4-nitroaniline, 2-nitro-4-chloroaniline, etc.; ether derivatives of primary aromatic amines such as o-anisidine, 2-methoxy-5-methylaniline, 2,5-dimethoxyaniline, 2-methoxy-1-naphthylamine, 2-aminodiphenylether, 2 - methoxy - 5 - chloroaniline, 3-bromo-6-ethoxyaniline, 4-amino-4'-chloro - di - phenylether, 2-methoxy-4-nitroaniline, 2-methoxy-5-nitroaniline, 2-methoxy-4-nitro-5-methylaniline; monoacyl derivatives of aromatic diamines, such as N-hexahydrobenzoyl-p-phenylenediamine, N - hexahydrobenzoyl - p-toluylenediamine, N-benzoyl-p-phenylenediamine; monoacyl derivatives of diamino-phenol ethers, such as 2-benzoylamino-4-amino-anisole, 2-hexahydrobenzoylamino-5-amino-anisole, 2 - amino-5-phenoxyacetylamino-hydroquinone diethylether, the monomethyl, the monobenzyl and the monophenyl-urethane of 2,5 - diamino-hydroquinone dimethyl ether and diethyl ether; 2,5-diamino-4-alkoxy-chlorobenzenes; monoacyl derivatives of diamino-p-chlorophenyl ethers, such as 2-amino-4-chloro-5-acetylamino - diphenyl ether; amino derivatives of aromatic sulfones such as 3-amino-4-methyl-diphenyl sulfone, 2-amino-4'-methyl-diphenyl sulfone; amino derivatives of aromatic dialkylsulfonamides such as N-dimethyl-(3-amino - 4 - methylbenzene) - sulfonamide and the N-diethylamide; amino diarylamines and their ether derivatives and their nitro derivatives such as 2-methoxy-5-amino-diphenylamine, 3,4' - dinitro-4-amino - diphenylamine; amino-azo compounds such as 3,2'-dimethyl-4-amino-azobenzene, and the like.

In addition to the above there are numerous aromatic diamines in which only one of the amino groups is diazotized. Such amino-diazo compounds may be reacted with amino and hydroxy aromatic acyl guanylureas to form dyes falling within the scope of the present invention. An amine of this type is 2,6-chloro-1,4-phenylenediamine.

Diamines in which both amino groups are diazotized to form tetrazo compounds will also condense with amino and hydroxy aromatic acyl guanylureas. Amines of this class are benzidine, p-phenylenediamine, o-tolidine, 2,6-diethoxy-1,4-phenylenediamine, o-dianisidine, 4,4'-diaminostilbene, 4,4' - diaminodiphenylamine, 1,5 - di - aminonaphthalene and the like.

Diazo and tetrazo compounds derived from aromatic amines of the heterocyclic type can also be reacted with amino and hydroxy aromatic acyl guanylureas. Typical of these heterocyclic amines are 2-amino-carbazole, 3,6-diamino-carbazole, 1-amino-5-fluorobenzothiazole, 2-amino-3-nitrodibenzothiophene, 3-aminobenzol,2,4-triazole and 3 - amino - (4'-aminobenzo)-1,2,4-triazole.

The coupling of diazotized amines or diazotized aromatic acyl guanylureas with coupling components of the class described herein is normally carried out in slightly alkaline medium at low temperatures as in conventional diazoic coupling procedures. In certain cases, however, the coupling is preferably effected in a slightly acid medium. The reaction does not require a critical proportion of reagents but ordinarily the two components are used in substantially equi-molecular proportions. In the preparation of certain tetrazo dyes, however, two molecular proportions of aromatic acyl guanylurea are used for each molecular proportion of the tetrazonium reactant.

Most of these arylazoaroylguanylurea dyes may also be prepared from the corresponding arylazoaroyldicyandiamides by hydrolysis of the terminal —C≡N group of the arylazoaroyldicyandiamide with an acid having a dissociation constant of at least $1 \times 10^{-4}$. The arylazoaroyldicyandiamides, which are also new compounds, are described and claimed in my co-pending application Serial No. 477,275 filed Feb. 26, 1943. These compounds are converted into compounds covered by the present invention by hydrolysis with acids such as hydrochloric, sulfuric, sulfurous, phosphoric, phthalic, chloracetic, toluenesulfonic, sulfamic and others, as described in the aforementioned application of Kaiser and Thurston, Serial No. 463,666. Since the preparation of acylated guanylureas from acylated dicyandiamides is broadly claimed in this latter application this method of preparing arylazoaroylguanylureas is not specifically claimed in this application.

As previously indicated, dyes may be formed having many different characteristics and generalizations as to the outstanding properties of these products are difficult to make. Their solubility characteristics vary considerably, some being water soluble and some water insoluble. Most of them are difficultly soluble in both acids and alkalis in the absence of solubilizing groups. In general they are soluble in organic solvents such as pyridine, dioxane, the monomethyl and monoethyl ether of ethylene glycol, etc.

The preparation of a typical aromatic acyl guanylurea and the preparation of representative dyestuffs from aromatic acyl guanylureas will now be illustrated in the following specific examples. Examples are also given of the preparation of arylazoaroylguanylureas from corresponding arylazoaroyldicyandiamides. It should be understood, of course, that the invention is not limited to the particular dyestuffs described herein or the particular details of the processes set forth. All parts are by weight unless otherwise indicated.

*Example 1*

185 parts of p-nitrobenzoyl chloride was dissolved in 396 parts of acetone and added to a cold mixture of 306 parts of 50% sodium hydroxide, 100 parts of dicyandiamide, 396 parts of acetone and 200 parts of water. The temperature was kept at 5–10° C. and the addition was complete in a half-hour. The mixture was then diluted with water, neutralized and filtered. The material was then purified by dissolving in an excess of potassium hydroxide solution and cooling, whereupon the potassium salt of p-nitrobenzoyldicyandiamide was precipitated. The acyl dicyandiamide was recovered from its salt by dissolving in water and neutralizing with hydrochloric acid.

955 parts of $Fe_2SO_4.7H_2O$ was dissolved in 1500 parts of water and the solution heated to refluxing temperature with stirring. In the meantime 1250 parts of water was heated almost to boiling, 90 parts of concentrated ammonium hydroxide was added and then 100 parts of p-nitro-benzoyldicyandiamide was added. This latter solution was added to the boiling ferrous sulfate solution followed by sufficient ammonium hydroxide (about 450 parts) to make the mixture faintly alkaline. Boiling was continued for 10 minutes and the mixture was then cooled in an ice bath. The solution was filtered to remove insoluble material which was extracted with dilute alkali to remove the p-aminobenzoyldicyandiamide contained therein. Upon neutralization of the alkaline solution p-aminobenzoyldicyandiamide was obtained as a pale yellow material decomposing when heated at 235–237° C.

20 parts by weight of p-aminobenzoyldicyandiamide obtained by reduction of p-nitrobenzoyldicyandiamide with ferrous sulfate as described above was treated with 200 parts by weight of 2% hydrochloric acid at room temperature for one hour. The insoluble matter was filtered and the solution neutralized with dilute ammonia to a pH of about 5.0. The precipitate of the p-aminobenzoylguanylurea was boiled for a short time with a slight excess of 10% hydrochloric acid to insure complete conversion of the p-aminobenzoyldicyandiamide to p-aminobenzoylguanylurea. The latter product was recovered by filtering the precipitate obtained upon neutralizing the solution with ammonium hydroxide as before. The p-aminobenzoylguanylurea thus obtained had a faintly yellow color and decomposed when heated at 170–175° C. Upon recrystallization from a methanol-water mixture a colorless product was obtained which decomposed at 178–180° C.

22.1 parts by weight of p-aminobenzoylguanylurea was dissolved in 150 parts by weight of 10% hydrochloric acid. A solution of 6.9 parts of sodium nitrite in 50 parts of water was added slowly to the above at 3 to 5° C. until the theoretical amount of sodium nitrite had been added. After stirring for about 15 minutes sufficient sodium sulfamate was added so that a sample of the reaction mixture gave only a faintly positive reaction to the starch-potassium iodide test.

9.3 parts by weight of aniline was then added to the reaction mixture followed by the addition with stirring of 32.8 parts of sodium acetate. A bright orange dye formed immediately. The product had the folowing structural formula.

The dye was soluble in dilute acids with a color change to a bright pink-red.

*Example 2*

30 parts by weight of the azo dye prepared as described in Example 1 was suspended in 150 parts by weight of 10% hydrochloric acid. The suspension was cooled in an ice bath and the dye further diazotized by the addition of a solution of 6.9 parts of sodium nitrite in 50 parts of water. As the nitrite solution was added the original pink suspension became brown and much thinner. The excess nitrous acid was then destroyed with sodium sulfamate.

9.5 parts of dimethyl aniline and 32.8 parts of sodium acetate were then added to the reaction mixture. Addition of the latter reagent caused the formation of a deep red dye having the following formula:

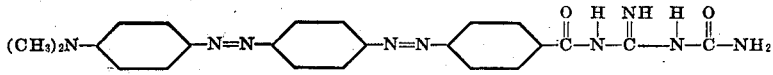

This product was soluble in dilute acids with a deep violet color.

*Example 3*

25 parts of p-aminobenzoyldicyandiamide was dissolved in a solution of 54 parts of 10% sodium hydroxide and 100 parts of water and poured slowly into a water-acid solution containing 235 parts of 10% hydrochloric acid and 900 parts of water with stirring at 5° C. A solution of 17 parts of sodium nitrite in 100 parts of water was aded slowly to the above until the theoretical amount of sodium nitrite had been added, i. e. about 60 parts of the sodium nitrite solution. After 20 minutes a small amount of dilute sodium sulfamate solution was added until samples of the reaction mixture were negative to the starch-potassium iodide test.

The neutralized solution was then poured into a solution containing 19.4 parts of β-naphthol, 54 parts of 10% sodium hydroxide and 41.2 parts of sodium carbonate in 1000 parts of water. After 4 to 5 hours of stirring, the red dye which had precipitated out was filtered, washed and vacuum dried. 10 parts by weight of the dried product was treated with an equal weight of concentrated hydrochloric acid at room temperature for about 10 minutes. The reaction mixture was then diluted with water and filtered. The product was believed to have the following structure:

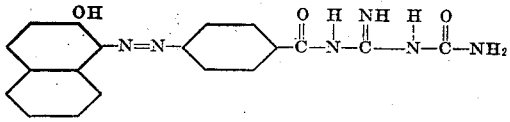

An aqueous suspension of the dye had a dull red color and was only slightly soluble in dilute hydrochloric acid.

*Example 4*

20.3 parts of crude m-aminobenzoyldicyandiamide was d'ssolved in a solution of 88.8 parts of 10% sodium hydroxide and 100 parts of water and poured slowly into a water-acid solution containing 158 parts of 10% hydrochloric acid and 100 parts of water with stirring at 5° C. A solution of 6.9 parts of sodium nitrite in 50 parts of water was added slowly to the above until the starch-potassium iodide test was faintly positive. This required the addition of about 75% of the nitrite solution.

The neutralized solution was then poured into a solution of 24 parts of 1-amino-8-hydroxy-3,6-disulfonaphthalene, 49 parts of 10% sodium hydroxide and 4.1 parts of sodium acetate in 750 parts of water. A scarlet-red dye believed to be

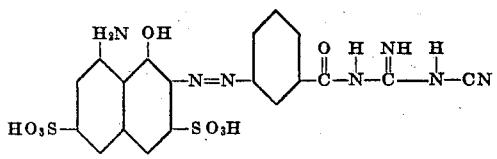

precipitated immediately. After 4 to 5 hours of stirring the dye was filtered, washed and vacuum dried.

10 parts of the dry dye was dissolved in about 25 parts of cold 50% sulfuric acid. After standing for 10 to 15 minutes the solution was diluted with water to give a precipitate lighter in color than the original dye. The precipitate was recovered, washed and dried. It was believed to have the following structural formula:

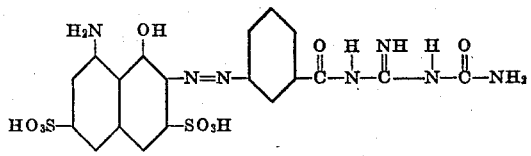

This arylazoaroylguanylurea dye was insoluble in hot dilute hydrochloric acid but was soluble in solutions of caustic soda.

A somewhat similar dye may also be prepared by using two molar quantities of the diazotized m-aminobenzoyldicyandiamine for each molar quantity of the 1-amino-8-hydroxy-3,6-disulfonaphthalene followed by hydrolysis with sulfuric acid. In this case the product is believed to have the following formula:

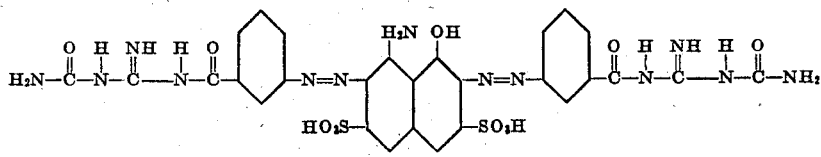

*Example 5*

25 parts of p-aminobenzoyldicyandiamide was dissolved in a solution of 88.8 parts of 10% sodium hydroxide and 100 parts of water and poured slowly with stirring into a water-acid solution containing 204 parts of 10% hydrochloric acid and 100 parts of water cooled to 5° C. A solution of 6.9 parts of sodium nitrite in 100 parts of water was added slowly to the above until the starch-potassium iodide test was faintly positive; this required the addition of about 75% of the nitrite solution.

17.4 parts of 1-phenyl-3-methyl-5-pyrazolone was suspended in a solution of 88 parts of 10% sodium hydroxide in 1000 parts of water. The diazotized p-aminobenzoyldicyandiamide was poured slowly into the suspension, the pH was adjusted to 7.5 to 8.0 and the reaction mixture stirred 2 to 3 hours in an ice bath. The mixture was neutralized and the orange dye filtered, washed and dried.

10 parts of the dry product thus obtained was boiled with 25 parts of 5% hydrochloric acid for 5 minutes whereupon a light yellow-orange dye was precipitated. The product having the following structural formula

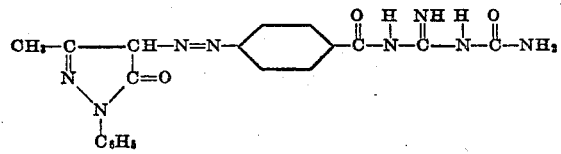

was recovered by filtration, washed and dried. This arylazoaroylguanylurea dye was very slightly soluble in dilute hydrochloric acid but dissolved in dilute caustic soda with a red color.

*Example 6*

25 parts of p-aminobenzoyldicyandiamide was diazotized as described in Example 6 and added to 1500 parts of a solution containing 15.5 parts of citrazinic acid and 88 parts of a 10% sodium hydroxide solution. Sufficient sodium acetate was added to bring the pH to 4.5. After standing for 3 hours in an ice bath the yellow-brown dye which had formed was filtered and washed. Treatment of the yellow-brown dye with hot 5% hydrochloric acid immediately converted it to an olive-yellow dye having the following formula:

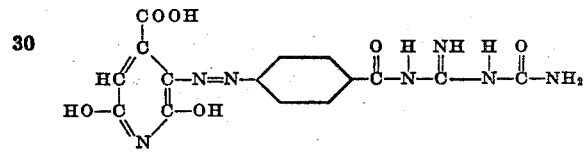

This dye was slightly soluble in acid but soluble in alkali with a deep brown color.

*Example 7*

16.2 parts of 2,5-dichloroaniline was dissolved on heating in 236 parts of 10% hydrochloric acid. The solution was then cooled to 5° C. and 7.5 parts of solid sodium nitrite added to obtain a clear solution. After 15 minutes a trace of gum was removed by filtration.

22.4 parts of m-hydroxyphenoxyacetyldicyandiamide was suspended in a solution of 88 parts of 10% sodium hydroxide and 40 parts of sodium carbonate in 1000 parts of water. To this suspension was added the filtered diazonium solution prepared above. The brown dye which formed immediately was filtered, washed and dried. A quantity of this material was macerated with an equal quantity of concentrated hydrochloric acid at room temperature for a few minutes. Upon dilution of the reaction mixture with water a guanylurea dye of a light brown color was obtained as an insoluble residue. The dye was believed to have the following formula:

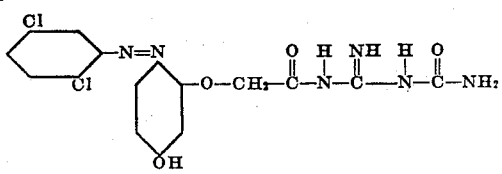

*Example 8*

15.8 parts of m-nitroaniline was suspended in 236 parts of 10% hydrochloric acid. The suspension was cooled to 5° C. and 7.5 parts of solid sodium nitrite was added in 1 to 2 minutes. A clear solution resulted.

22.4 parts of m-hydroxyphenoxyacetyldicyandiamide was suspended in a solution of 44 parts of 10% sodium hydroxide and 70 parts of sodium carbonate in 1000 parts of water. To this suspension was added the diazonium solution obtained above. An orange red dye formed immediately. This dye was recovered by filtration and dried. 15 parts of the dry product was treated with an equal weight of concentrated hydrochloric acid at room temperature for a few minutes. The reaction mixture was then diluted with water whereupon a semi-colloidal light red suspension of the dye was obtained. The dye was flocculated by the addition of sodium chloride. It had the following structural formula:

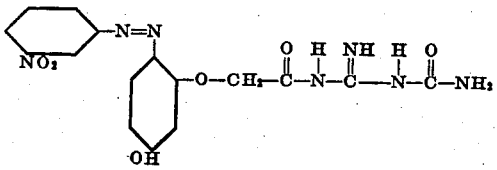

*Example 9*

11 parts by weight of m-aminobenzoylguanylurea was dissolved in a solution of 114 parts by weight of 10% hydrochloric acid and 100 parts by weight of water. The solution was then cooled to 0–5° C. and 3.5 parts by weight of sodium nitrite, dissolved in a small amount of water, was added slowly. Frequent tests were made with starch-potassium iodide paper and only enough sodium nitrite was added to give a positive test. After 15 minutes at 5° C. a small amount of sodium sulfamate was added to destroy the excess nitrous acid.

6.05 parts by weight of dimethylaniline was dissolved in a small amount of methanol and added to the diazotized solution of the m-aminobenzoylguanylurea described above. An orange dye precipitated immediately. After stirring the mixture in an ice bath for 3 hours the dye was filtered, washed and air-dried. It was believed to have the following structural formula:

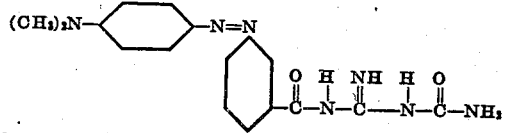

The orange dye was soluble in dilute hydrochloric acid with an orange red color.

*Example 10*

7.2 parts by weight of β naphthol was dissolved in 20 parts by weight of a warm 10% solution of sodium hydroxide and the solution cooled in an ice bath. To this cold solution a diazotized m-aminobenzoylguanylurea solution prepared exactly as described in the first paragraph of Example 9 was added in one portion. A bright red dye formed at once. After stirring first in an ice bath for one-half hour and then at room temperature for 2 to 3 hours the dye was filtered and washed. It was believed to have the following structure:

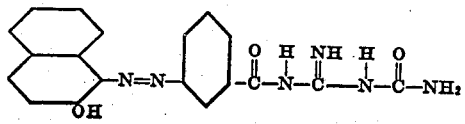

The dye was faintly soluble in hydrochloric acid but was more easily soluble in dilute solutions of caustic soda with development of a deep red color.

*Example 11*

13.1 parts by weight of β naphthanilide was dissolved in a little methanol and added to a cold solution of diazotized m-aminobenzoylguanylurea prepared as described in the first paragraph of Example 9. A red dye formed at once. After stirring for two hours at room temperature, the dye was filtered and washed with water. It was believed to have the following formula:

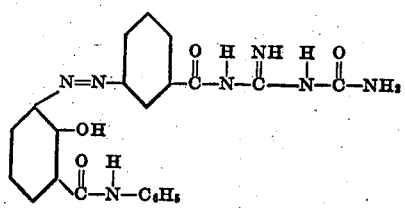

The dye was insoluble in dilute hydrochloric acid and was partly soluble in alkali to give a red colored solution.

*Example 12*

11.8 parts by weight of gamma acid was dissolved in 20 parts by weight of a 10% solution of sodium hydroxide and then cooled in an ice bath. A solution of diazotized aminobenzoylguanylurea, as in Example 9, was quickly added to the gamma solution. A deep reddish brown dye formed at once which was believed to have the structural formula:

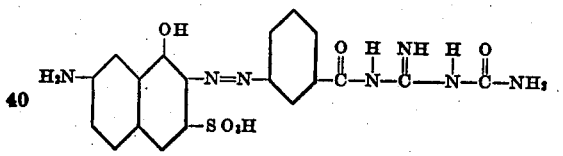

This dye was insoluble in acid and soluble in alkaline solution with deepening of the color.

*Example 13*

9.4 parts of β-oxynaphthoic acid was dissolved in water containing 2 parts of sodium hydroxide and the cold solution was combined with a diazotized solution of m-aminobenzoylguanylurea. A bright scarlet dye was precipitated. After stirring for 1 hour, the dye was recovered by filtration. It had the following structural formula:

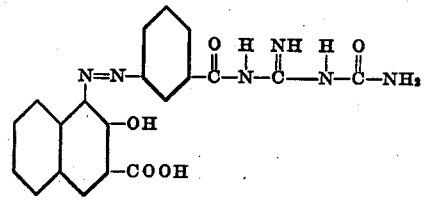

This dye was insoluble in acid but soluble in alkali to give a deep red colored solution.

What I claim is:
1. Azo dyestuffs of the general formula:

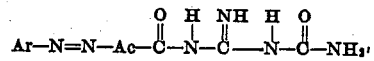

in which Ar is an aromatic radical, and Ac is an aromatic radical of the group consisting of radicals of the benzene and naphthalene series.

2. Azo dyestuffs of the general formula:

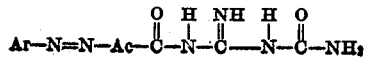

in which Ar is an aromatic radical and Ac is an aromatic radical of the benzene series.

3. Azo dyestuffs of the general formula:

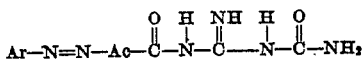

in which Ar is an aromatic radical and Ac is a phenyl radical.

4. Azo dyestuffs of the general formula:

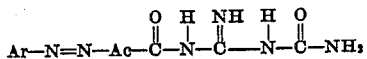

in which Ar and Ac are aromatic radicals of the benzene series.

5. Azo dyestuffs of the general formula:

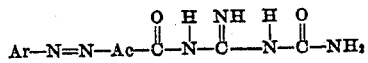

in which Ar is an aromatic radical of the naphthalene series and Ac is an aromatic radical of the benzene series.

6. An azo dye having the formula:

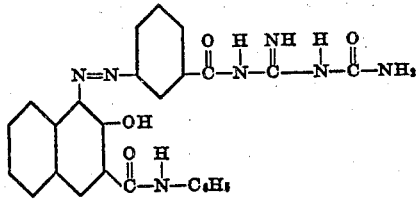

7. Azo dyestuffs of the general formula:

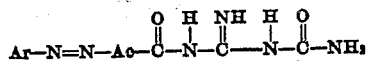

in which Ar is an aromatic radical of the pyrazolone series and Ac is an aromatic radical of the benzene series.

8. A method of preparing dyestuffs of the general formula:

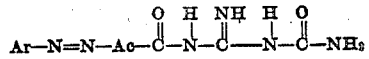

in which Ar is an aromatic radical and Ac is an aromatic radical of the group consisting of radicals of the benzene and naphthalene series which comprises the step of diazotizing an aminoaroylguanylurea of the group consisting of aminobenzoylguanylureas and aminonaphthoylguanylureas and coupling it to an aromatic coupling component of which the aromatic radical is a radical of the group consisting of radicals of the benzene and naphthalene series.

9. A method of preparing dyestuffs of the general formula:

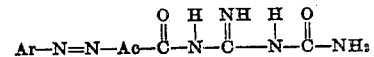

in which Ar is an aromatic radical and Ac is an aromatic radical of the group consisting of radicals of the benzene and naphthalene series which comprises the steps of diazotizing an aromatic amine and coupling it to an aromatic acylguanylurea of which the aromatic radical is a radical of the group consisting of radicals of the benzene and naphthalene series.

JACK T. THURSTON.